United States Patent [19]

Takeda

[11] Patent Number: 5,247,404
[45] Date of Patent: Sep. 21, 1993

[54] MAGNETIC RECORDING AND REPRODUCING APPARATUS WITH MAGNETIC HEAD DISPLACEMENT CORRECTION

[75] Inventor: Munehisa Takeda, Amagasaki, Japan

[73] Assignee: Mitsubishi Denki Kabushiki Kaisha, Tokyo, Japan

[21] Appl. No.: 572,459

[22] Filed: Aug. 27, 1990

[30] Foreign Application Priority Data

Sep. 29, 1989 [JP] Japan .................. 1-256784

[51] Int. Cl.$^5$ .................. G11B 5/588; G11B 5/592
[52] U.S. Cl. .................................. 360/77.16
[58] Field of Search .............. 360/77.12, 77.13, 77.14, 360/77.15, 77.16

[56] References Cited

U.S. PATENT DOCUMENTS

| | | | |
|---|---|---|---|
| 4,148,082 | 4/1979 | Okada | 360/77.15 |
| 4,443,823 | 4/1984 | Sakamoto | 360/77.16 |
| 4,520,410 | 5/1985 | Sekiguchi et al. | 360/77.13 |
| 4,933,784 | 6/1990 | Oldershaw et al. | 360/77.16 |
| 4,937,689 | 6/1990 | Seaver et al. | 360/78.07 |
| 5,025,329 | 6/1991 | Taniguchi et al. | 360/77.16 |
| 5,072,319 | 12/1991 | Kohri et al. | 360/77.16 |

FOREIGN PATENT DOCUMENTS

0368497 5/1990 European Pat. Off.
53-45509 4/1978 Japan.
2160348 12/1985 United Kingdom.

OTHER PUBLICATIONS

"Design of Discrete Time Repetitive Controllers with Applications to Disk File Servo Systems" by M. Tomizuka and C. J. Kempf. Jul. 1989.

Primary Examiner—Joseph L. Dixon
Assistant Examiner—David L. Robertson

[57] ABSTRACT

A magnetic recording and reproducing apparatus of the helical scanning type, such as a videotape recorder and a DAT (Digital Audio Tape Recorder), in which a magnetic head is controlled so as to move perpendicularly to its scanning direction to fit the undulation of a recording track. For this controlled movement, the apparatus includes a reference signal storage for storing a head displacement signal, which is outputted from a head-moving signal operating unit, as a reference signal for the next scanning operation. With this arrangement, control of the movement of the magnetic head for every recording track is possible to correct a displacement about a position of a magnetic head based on the reference signal, thus increasing convergence of displacement.

15 Claims, 11 Drawing Sheets

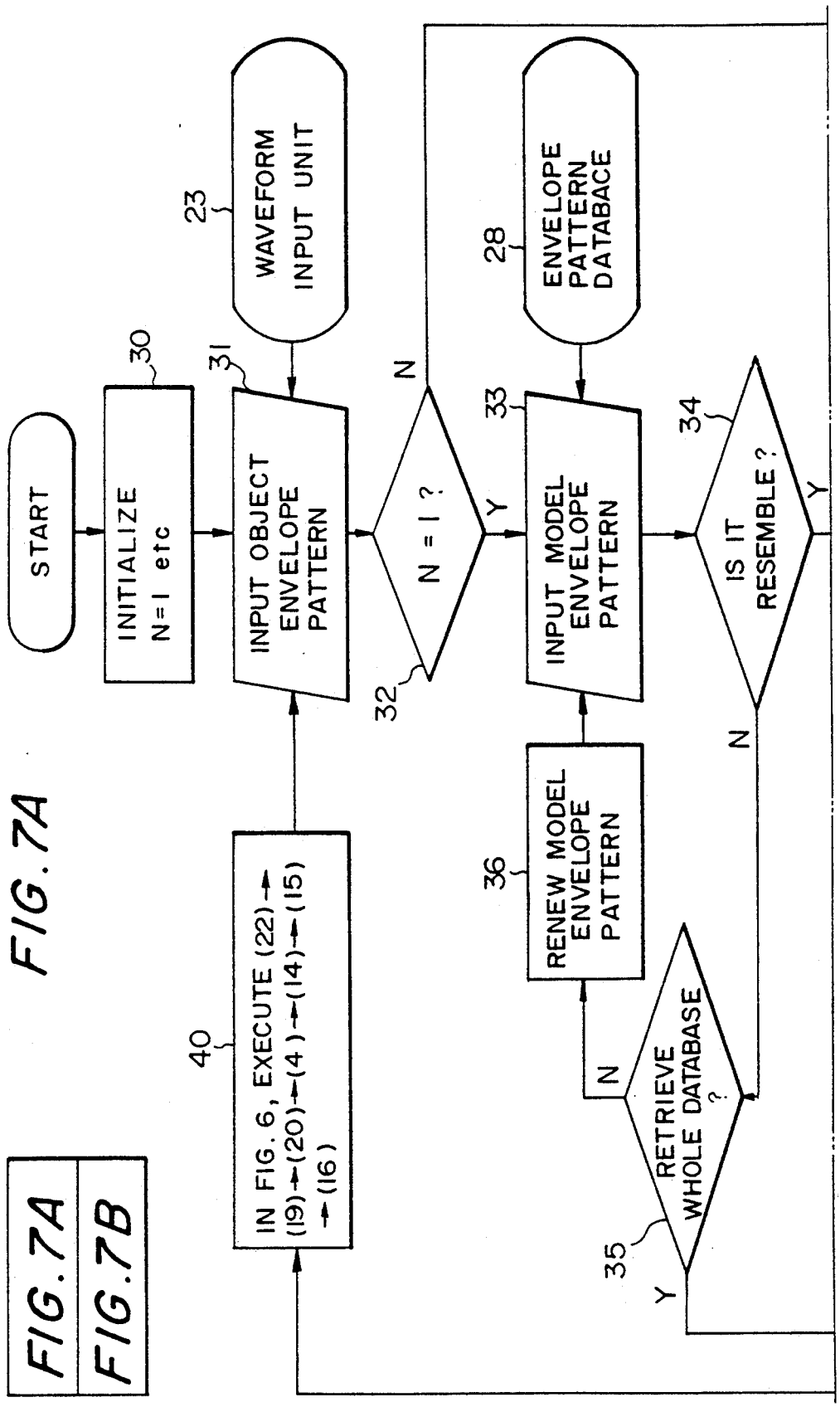

NORMAL REPRODUCTION

STILL REPRODUCTION

SLOW REPRODUCTION

QUICK REPRODUCTION

MAGNETIC RECORDING AND REPRODUCING APPARATUS WITH MAGNETIC HEAD DISPLACEMENT CORRECTION

BACKGROUND OF THE PRESENT INVENTION

Field of the Present Invention

The present invention relates generally to a magnetic recording and reproducing apparatus of the helically scanning type in which a magnetic head is controlled so as to move perpendicularly to its scanning direction to fit the undulation of a recording track, and more particularly, to an improvement on the head-movement control manner of the magnetic recording and reproducing apparatus.

Description of the Related Art

FIG. 8 of the accompanying drawings shows a head control technique of a prior magnetic recording and reproducing apparatus which is exemplified by Japanese Patent Laid-Open Publication No. 45509/1978. In FIG. 8, reference numeral designates a fixed drum and 2, a rotary drum. The fixed drum 1 has a tape guide groove along which a tape 3 travels. In use, the tape 3 is in contact with the peripheral surface of each of fixed drum 1 and the rotary drum 2 through about 190°. A pair of magnetic head actuators 4a and 4b, which is equipped with magnetic head 5 as shown in FIG. 9, is attached to the rotary drum 2 at an angle of 180°.

Reference numeral 14 designates a head amplifier for amplifying a reproducing signal of the magnetic head 5; 15, an envelope detector circuit for detecting an envelope of FM signal of the reproducing signal; 16, an A/D converter for converting an analog signal into a digital signal; 17, a waveform generator for generating a basic head-moving signal for each of various kind of reproducing modes, such as speed search; 18, an automatic tracking control unit for producing a head displacement signal, which scans a target track on a tape, from the basic signal of the waveform generator 17 and the signal of the A/D converter 16; 19, a D/A converter for converting a digital signal into an analog signal; and 20, a head driver for driving the magnet head actuators 4a and 4b.

The magnetic head actuators 4a and 4b drive a magnetic head 5 to move along a line parallel to the axis of the rotary drum 2. In FIG. 9, reference numeral 6 designates a coil bobbin composed of a tubular bobbin body 6a and a coil 6b. 7a represents a first gimbal spring. 7b represents a second gimbal spring. 8a represents a first attachment member firmly fastening one end of the coil bobbin 6 with the gimbal spring 7a. 8b represents a second attachment member firmly fastening the other end of the coil bobbin 6 with the gimbal spring 7b. 9 represents a tubular outer peripheral yoke which is made of a substance high in permeability and which has an inside diameter larger than the diameter of the coil bobbin 6. 10a and 10b represent disk-shaped outer peripheral yokes made of a substance having a high permeability and fixedly attached to the opposite ends of the tubular outer peripheral yoke 9. 11a and 11b represent cylindrical permanent magnets. 12 designates a center pole to which opposite ends the permanent magnets 11a and 11b are fixedly attached by an adhesive agent to form a magnetic circuit. This magnetic circuit is disposed in the tubular yoke 9 axially thereof. The coil bobbin 6 is disposed outwardly of the center pole 12 so as to prevent contact therewith and is held by the gimbal springs 7a and 7b so as to be axially movable. Designated by 13 is a leaf spring serving as a head attachment member fixedly attached at one end to the coil bobbin 6 and at the other end to the magnetic head 5.

In operation, an output signal of the magnetic head 5 is amplified by the head amplifier, and the envelope rectifier circuit 15 detects an envelope of the output signal. This analog signal is converted into a digital signal at every sampling time $\Delta T$ by the A/D converter 16 and is then inputted to the automatic tracking control unit 18.

Meanwhile, the waveform generator 17 generates a basic head-moving signal so as to fit to a reproducing mode such as speed search and supplies the basic signal to the automatic tracking control unit 18. In the automatic tracking control unit 18, a scanning error (displacement) is detected from the FM envelope obtained from the head reproducing signal. Then the automatic tracking control unit 18 superimposes a correcting signal representing a displacement correcting direction over the basic signal generated by the waveform generator 17 and produces a head moving signal. This head moving signal is outputted for every sampling time $\Delta T$ by the D/A converter 19. The D/A converter 19 converts the digital signal (head moving signal), which is from the automatic tracking control unit 18, into an analog signal and outputs this analog signal to the head driver 20. The head driver 20 drives the magnetic head actuators 4a and 4b according to the head moving signal so that the magnetic head 5 is moved to trace the target track on the tape. When one magnetic head 5a terminates scanning on the tape, the other magnetic head 5b starts scanning. One magnetic head 5a returns to the initial point (dotted-line portion in FIG. 10), e.g., to the straight line, while the other magnetic head 5b is scanning the track on the tape (solid-line portion in FIG. 10).

Further, as shown in FIGS. 11 through 13, in special reproduction such as still reproduction, slow reproduction or quick reproduction, the head moving signal has a triangular waveform.

However, since the tape 3 in the prior apparatus travels along the tape guide groove formed on the fixed drum, the ability to keep the recording track straight depends on the rectilinearity of the tape guide groove. This rectilinearity of the tape guide groove is not perfectly straight, but includes microscopic curves. Therefore, the recording track on the tape has a recording line (meandering) which is peculiar to an individual apparatus due to the particular configuration of the tape guide groove. As a result, since the conventional head-moving control is intended for perfect traveling, it is impossible to realize accurate track tracing which follows the meandering of the recording track, if the amount of such meandering is large.

Further, in the head control of the prior art apparatus, as shown in FIGS. 10 through 13, upon termination of scanning of the track on the tape, the magnetic head is only returned to a predetermined initial point on the rear side of the tape, the speed and acceleration would sharply vary at the start point of scanning, depending on the manner of displacement. This causes the magnetic head to vibrate, thus deteriorating the quality of image.

In addition, according to the head control of the prior apparatus, a displacement of the head is detected from the level of a reproducing FM envelope signal. However, since the level of an FM envelope signal will be lowered not only due to a track displacement but also due to a poor contact of the head, an accurate amount of track displacement cannot be obtained. Consequently, in the prior art, it is impossible to perfectly correct the track displacement.

SUMMARY OF THE PRESENT INVENTION

It is therefore an object of the present invention to provide a magnetic recording and reproducing apparatus equipped with a learning function for detecting a displacement to correcting a basic head-moving signal by accumulating a displacement every time scanning is repeated and by utilizing the characteristic such that a target track described on a tape at regular spaces is repeatedly scanned.

Another object of the present invention is to provide a magnetic recording and reproducing apparatus which is free from any vibration or the like at a scanning start point and hence can reproduce a high quality image.

Still another object of the present invention is to provide a magnetic recording and reproducing apparatus in which lowering of the level of an FM envelope signal due to a displacement and that due to a poor contact of the head can be discriminated so that accurate correction of displacement can be achieved to reproduce a high quality image.

According to the present invention, there is provided a magnetic recording and reproducing apparatus comprising: a magnetic head driver for moving a magnetic head, which is mounted on an outer periphery of a rotary drum, perpendicularly to the scanning direction of the magnetic head; a first waveform generator for generating a basic head-moving signal; a displacement detector for sampling an amount of displacement of the magnetic head with respect to a target recording track of a magnetic tape for every predetermined period based on a reproducing signal of the magnetic head; a displacement accumulating storage device for accumulating the displacement for every new scanning and for storing the displacement per sampling time; and a displacement signal generating unit for correcting the basic head-moving signal in such a manner that the amount of displacement accumulated and stored is zero and for generating a displacement signal.

With this arrangement, since a head moving signal is generated in such a manner that the amount of displacement having been accumulated by the previous time will be zero, the error would be minimized as the reproducing scanning is repeated, thus obtaining a high quality image.

The above and other advantages, features and additional objects of the present invention will be manifest to those versed in the art upon making reference to the following detailed description and the accompanying drawings in which several preferred structural embodiments incorporating the principles of the present invention are shown by way of illustrative example.

Figure 1:
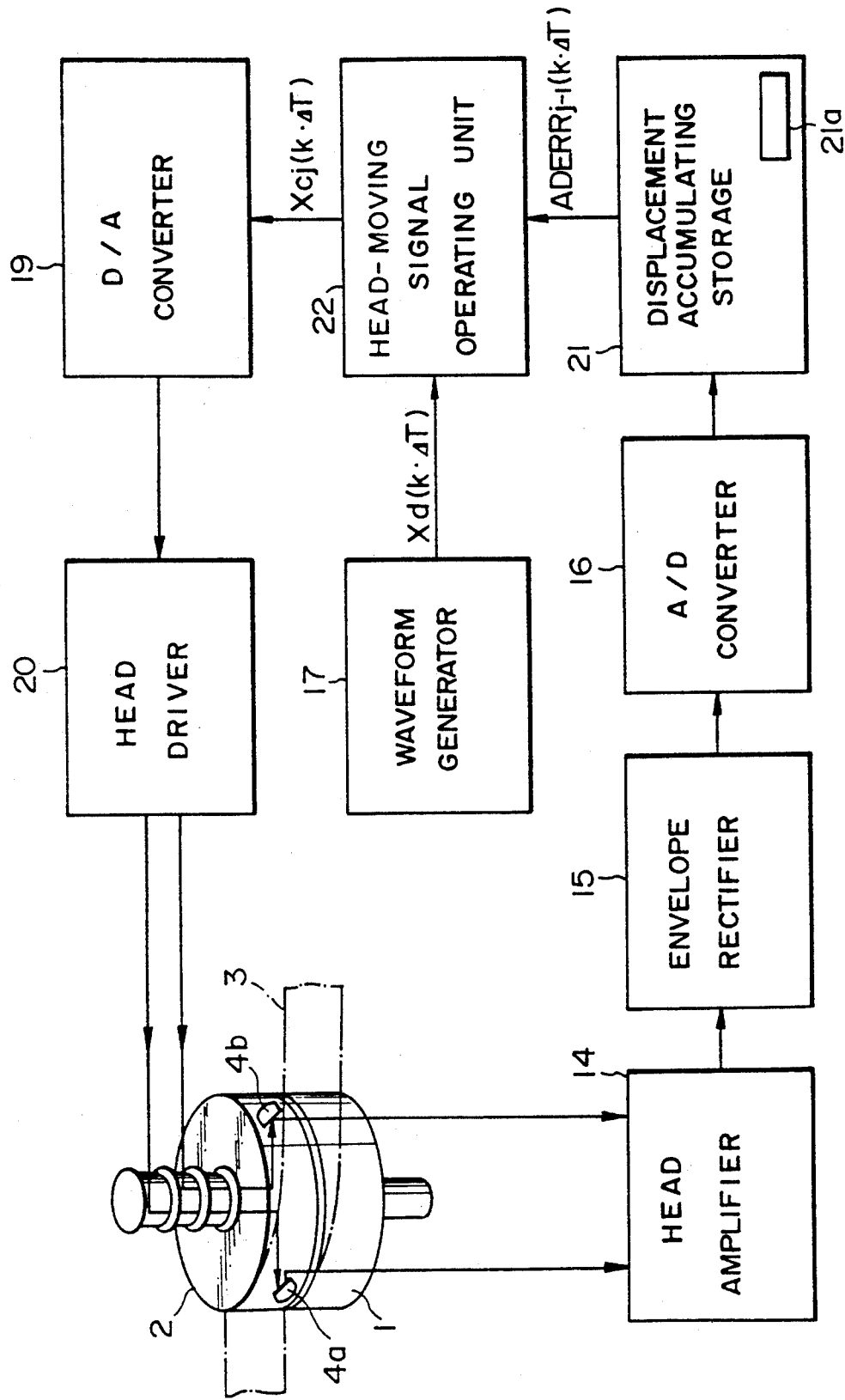
FIG. 1 is a block diagram showing a head control system of a magnetic recording and reproducing apparatus according to a first embodiment of the present invention.
Figure 2:
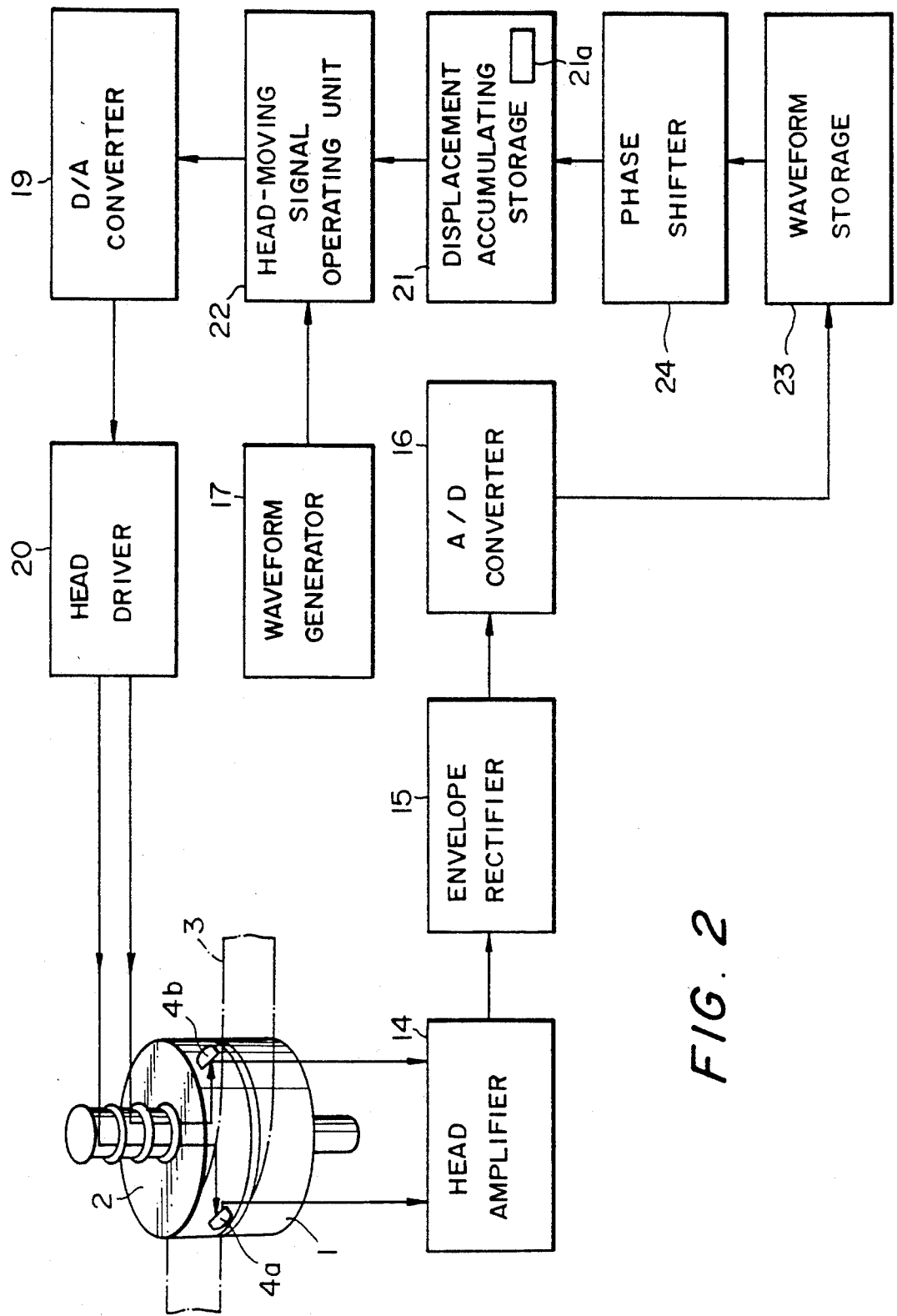
Figure 3:
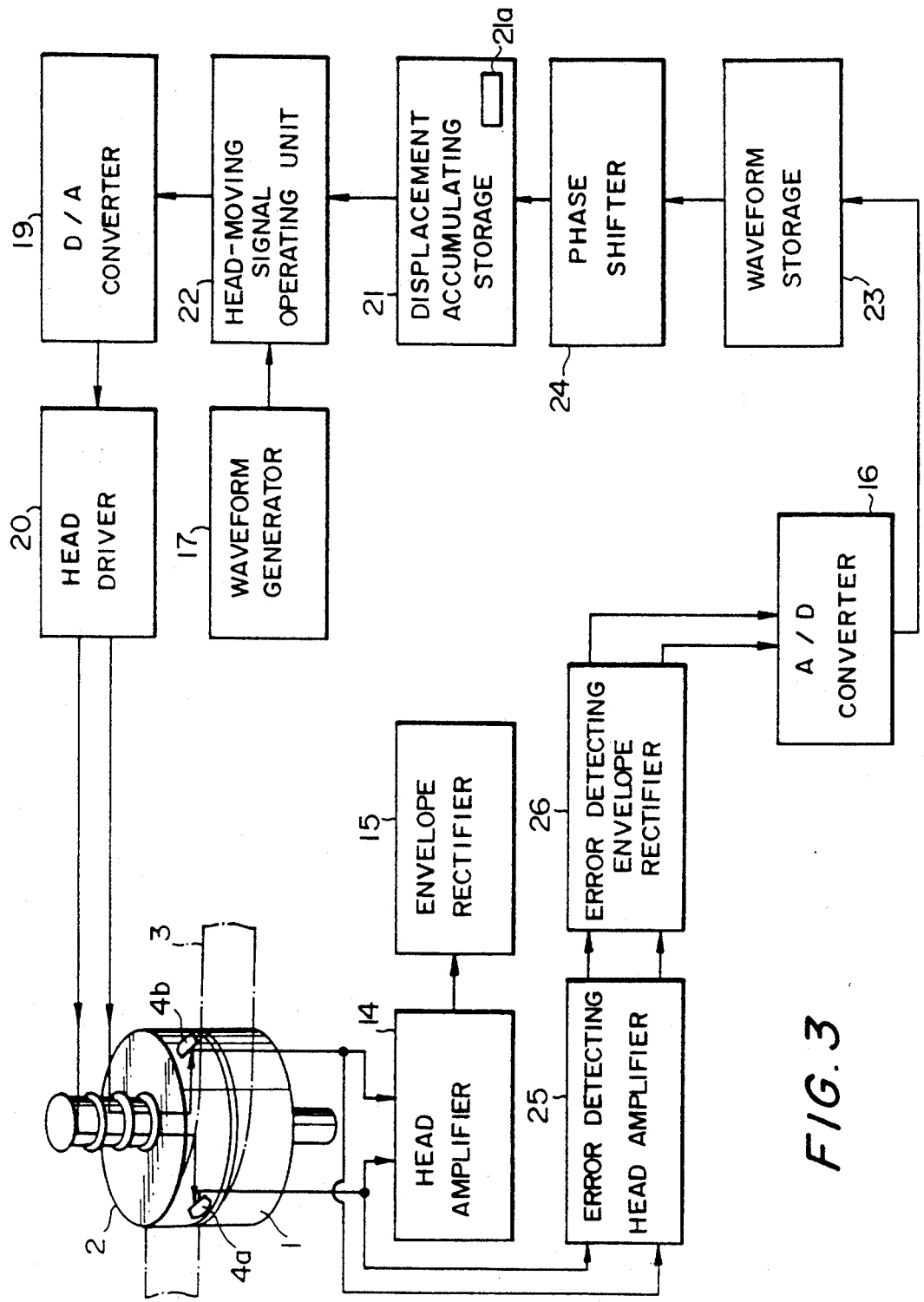
Figures 4A, 4B:
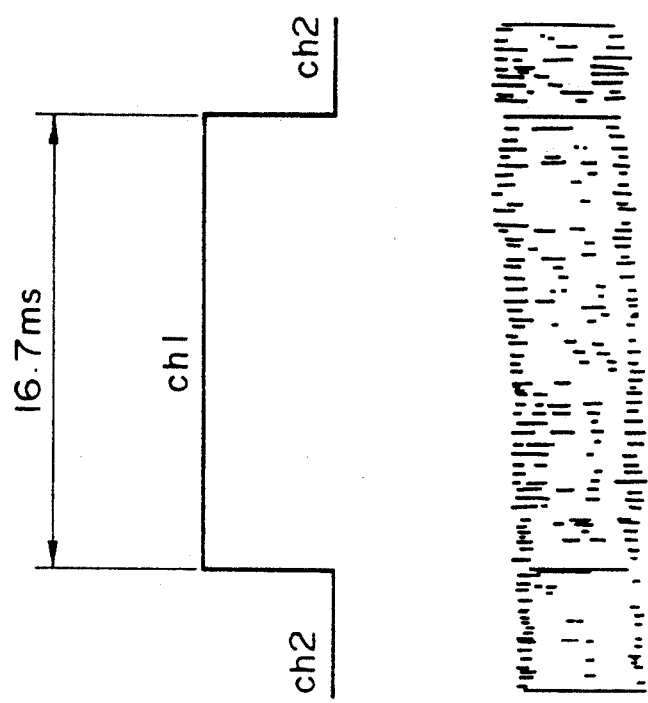
Figure 5:
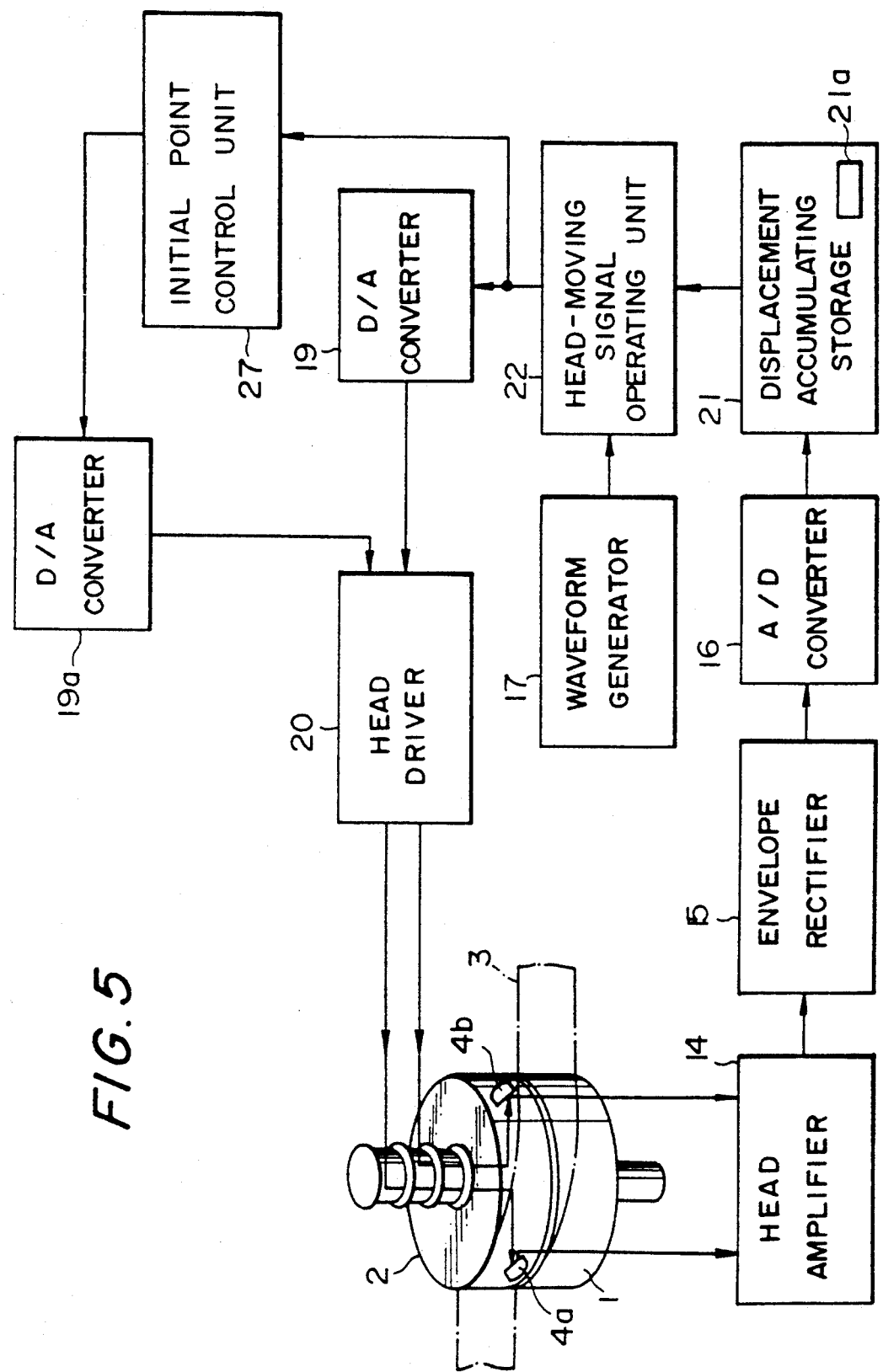
Figure 6:
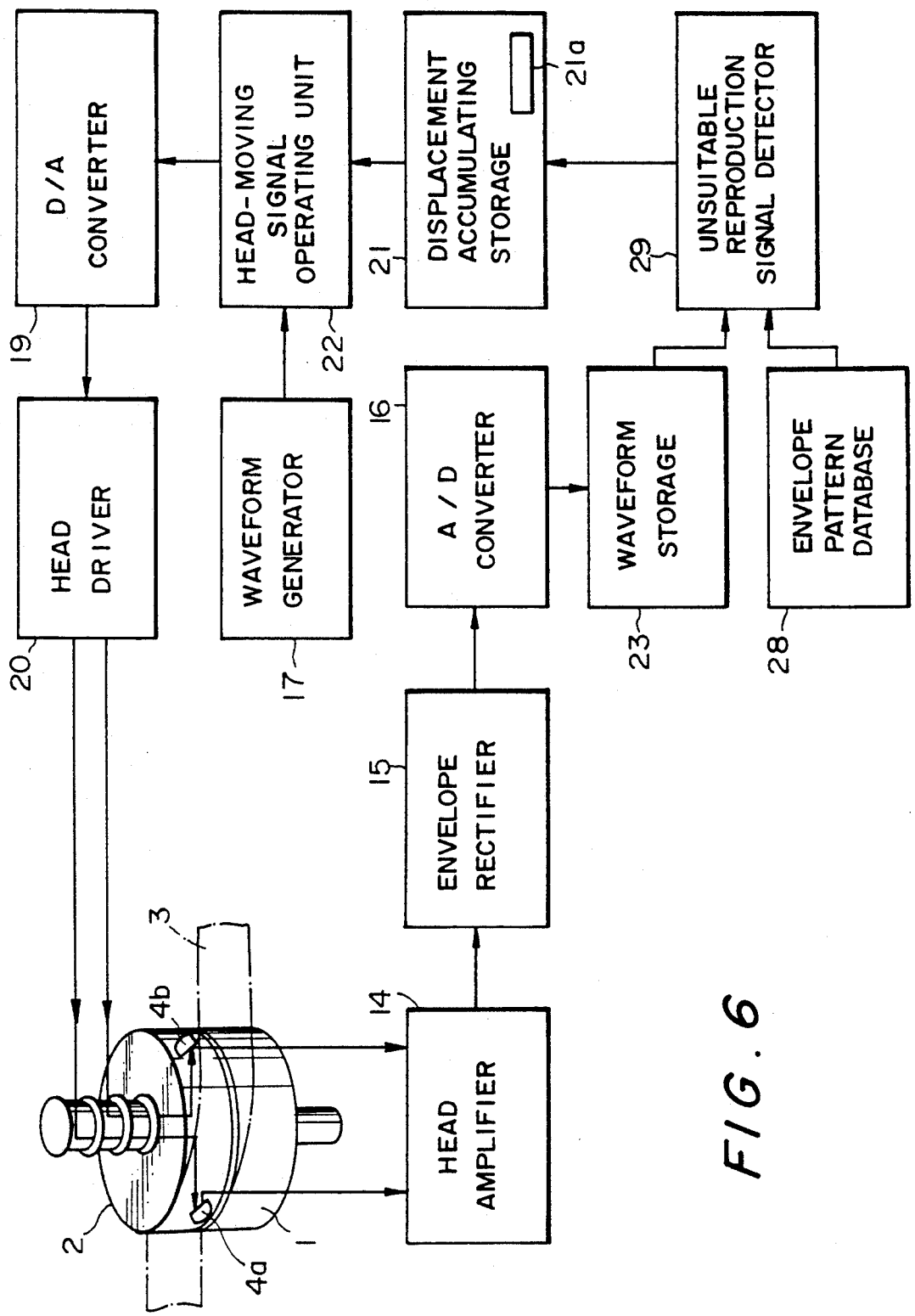
Figure 7B:
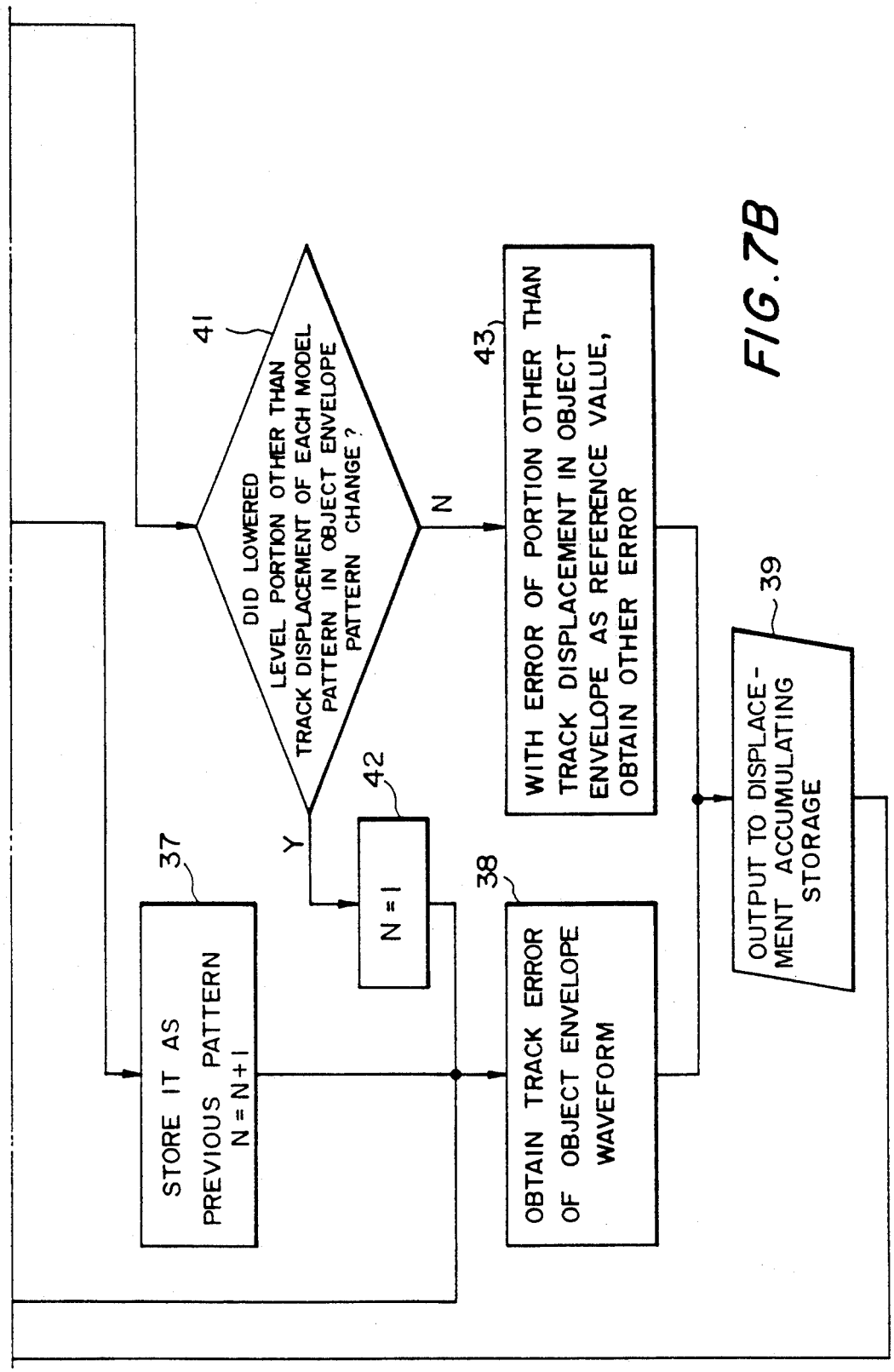
Figure 8:
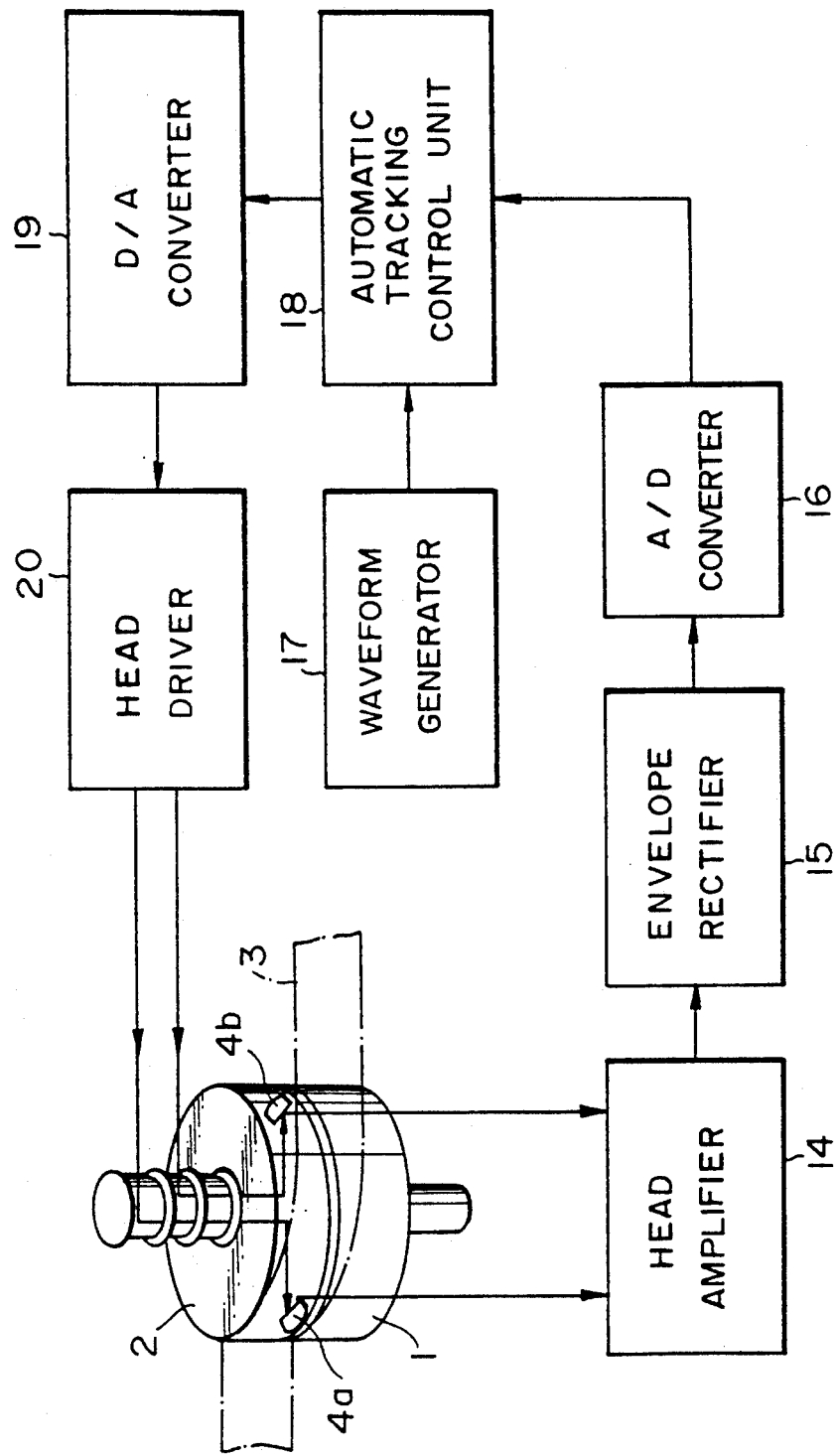
Figure 9:
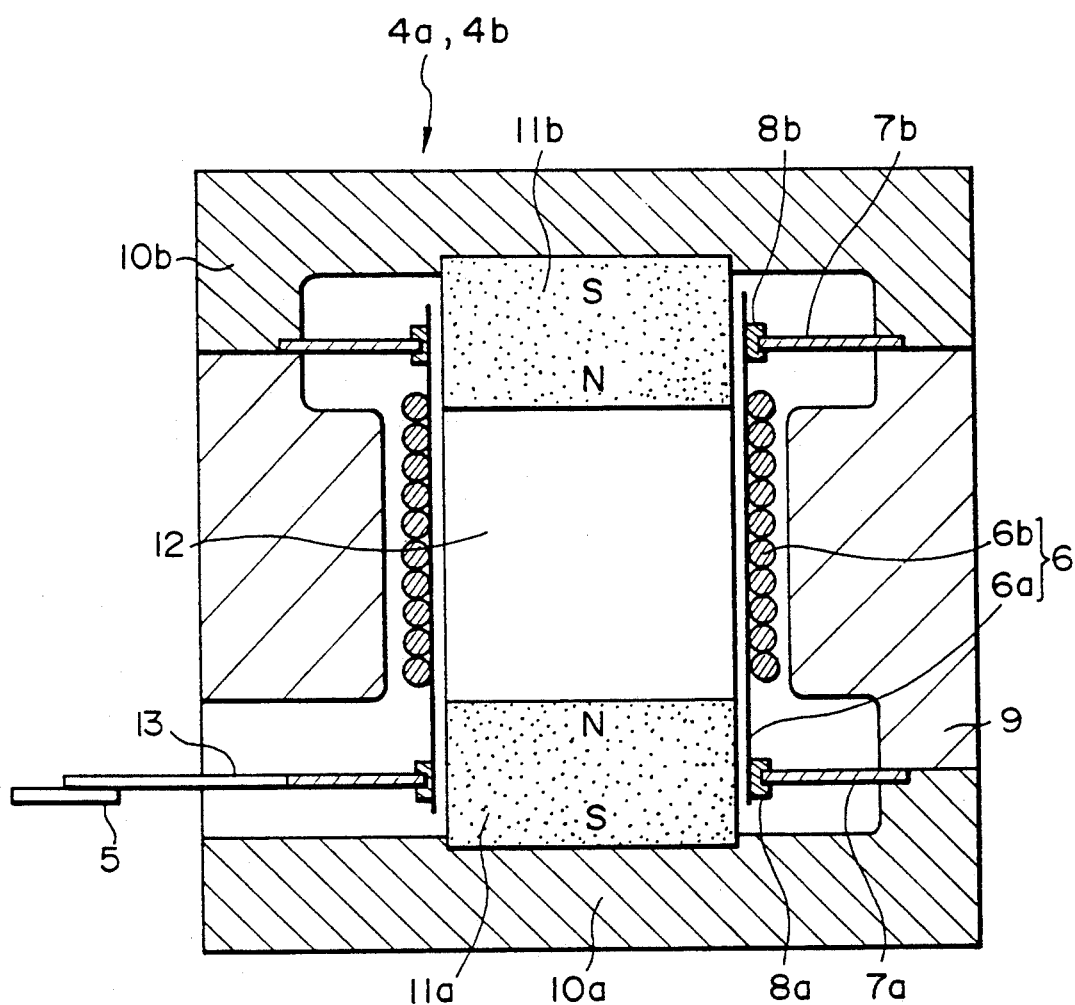
Figure 10:
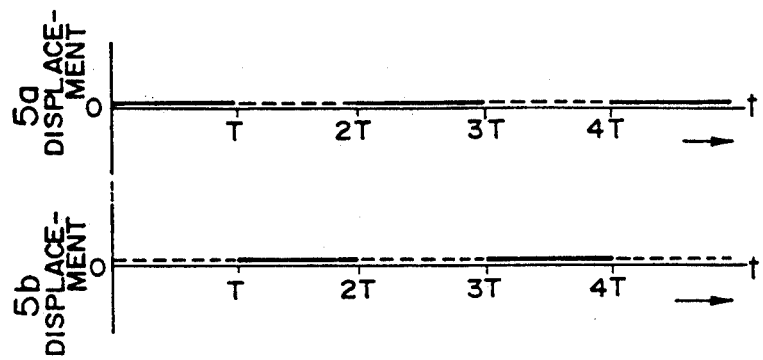
Figure 11:
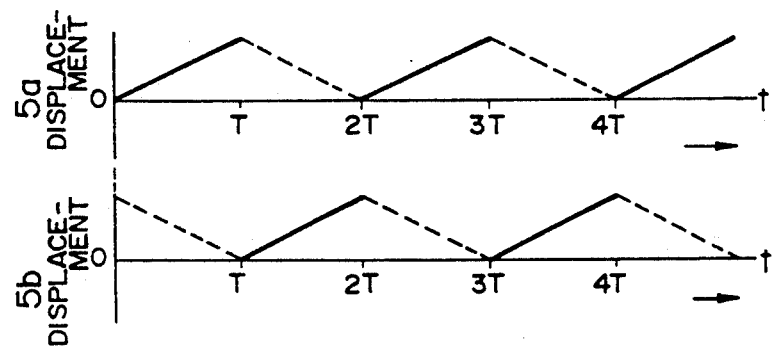
Figure 12:
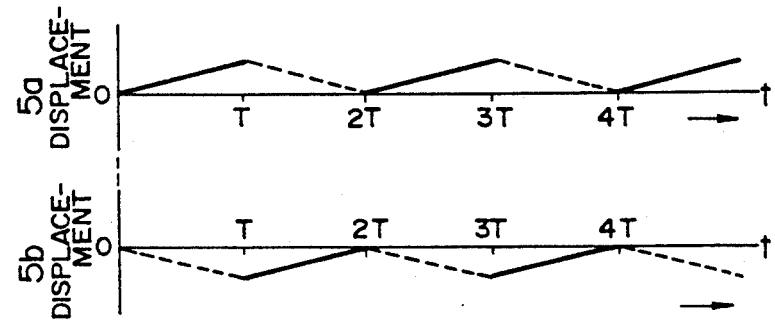
Figure 13:
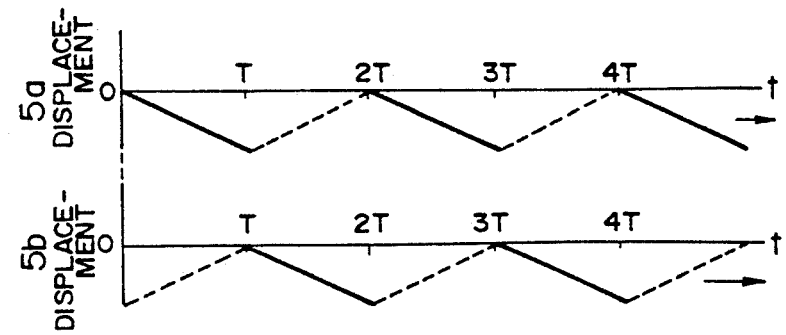

FIG. a block diagram similar to FIG. 1, showing a second embodiment;

FIG. 3 is a block diagram similar to FIGS. 1 and 2, showing a third embodiment;

FIGS. 4(a) and 4b) are diagram showing typical FM envelope waveforms;

FIG. 5 is a block diagram similar to FIGS. 1 through 3, showing a embodiment;

FIG. 6 is a block diagram similar to FIGS. 1 through 3 and 5, showing a fifth embodiment; FIG. 7 is broken down to FIGS. 7A and 7B which illustrate a flowchart showing the process to be performed by a track error detecting unit;

FIG. 8 is a block diagram showing a head control system according to a conventional apparatus;

FIG. 9 is a detailed cross-sectional view showing a magnetic head actuator; and

FIGS. 10 through 13 respectively showing various typical head driving patterns.

DETAILED DESCRIPTION

Various embodiments of the present invention will now be described in connection with the accompanying drawings.

FIG. 1 shows a head control system of a magnetic recording and reproducing apparatus according to a first embodiment. Like reference numerals designate similar parts throughout FIGS. I and 8. In FIG. 1, reference numeral 21 designates a displacement accumulating storage for accumulating an amount of displacement of a magnetic head for every new scanning and for storing the amount of displacement for each sampling time. The displacement accumulating storage 21 is equipped with a displacement detecting unit 21a for detecting an amount of displacement of a magnetic head 5, with respect to a target recording track, based on an FM envelope outputted from an envelope rectifier 15. Reference numeral 22 designates a head-moving signal generating unit for correcting a head-moving basic signal, which is outputted from a waveform generator 17, and generating an executing head moving signal, in such a manner that the accumulated amount of displacement will be zero.

In operation, like the prior art, a reproducing signal of the magnetic head 5 is amplified by the head amplifier 14, and its envelope is detected by the envelope rectifier 15. This analog signal is converted into a digital signal at every sampling time $\Delta T$ by the A/D converter 16 and is transmitted to the displacement accumulating storage 21. In the displacement accumulating storage 21, an amount of displacement $e(k.\Delta T)$ (where k stands for the number of samplings) of a magnetic head with respect to a target track, accumulates the displacement, for every new scanning, according to the equation (1) and storages it at every sampling time.

$$ADERR_{j-1}(k \cdot \Delta T) = \sum_{i=1}^{j-1} e_i(k \cdot \Delta T) \quad (1)$$

(j stands for the number of times of executed scanning)

To the head-moving signal generating unit 22, a basic head signal $Xd(k \cdot \Delta T)$ outputted form the waveform generator 17 and the accumulated displacement $ADERR_j(l \cdot \Delta T)$ stored in the displacement accumulating storage 21 are inputted. The head-moving signal generating unit 22 produces the next (j-th) executing head-moving signal $Xc_j(k \cdot \Delta T)$ represented by the equation (2) and outputs this signal to the D/A converter 9.

$$Xc_j(k \cdot \Delta T) = Xd(k \cdot \Delta T) + \gamma ADERR_{j-1}(k \cdot \Delta T) \quad (2)$$

where γ stands for a gain of learning control.

The D/A converter 19 converts a digital signal from the head-moving signal generating unit 22 into an analog signal and outputs the analog signal to the head driver 20. The head driver 20 causes a current to flow, which corresponds to the executing head moving signal, through the coil of the magnetic head actuator 4, thereby moving the magnetic head 5. With movement of the magnetic head, the j-th tracing will be completed. The magnetic head output at that time is reamplified by the head amplifier 14 and is then detected. The foregoing processes are successively repeated.

As discussed above, since the displacement $e(k \cdot \Delta T)$ is accumulated and stored for every new scanning, the accumulated and stored displacement $ADERR_{j-1}(k \cdot \Delta T)$ converges to a value. Namely, since a basic signal $Xd(k \cdot \Delta)$ is corrected to an exeouting head-moving signal $Xc_j(k \cdot \Delta T)$ in such a manner that the detected displacement will be zero, the magnetic head 5 will trace a target track accurately. Therefore, the displacement $e(k \cdot \Delta T)$ will gradually become zero so that the displacement $ADERR_{j-1}(k \cdot \Delta T)$ will not vary.

In the first embodiment, each element of the waveform generator 17, the displacement accumulating storage 21 and the head-moving signal operating unit 22 are independent of each other. However, these elements may be substituted for a single element such as a microcomputer. The present invention should be no means be limited to the illustrated example.

Since the head control system of the first embodiment is designed so as to determine a head-moving signal by using only the displacement accumulated over time, the amount of displacement will be reduced as the reproduction scanning is repeated. However, the ratio of reduction of displacement is small, and there is a limit in precision.

FIG. 2 shows a second embodiment of the present invention, in which an error can be converged quickly, thereby realizing a higher quality image. Like reference numerals designate similar parts throughout FIGS. 1 and 2. In FIG. 2, reference numeral 23 designates a waveform storage for storing an envelope waveform for every sampling time $\Delta T$. The waveform storage 23 stores reproducing signals of magnetic heads 5a and 5b to be switched at every 180° angular movement of the rotary drum 2. Here in the specification, the term "reproducing signal" means a signal which is reproduced, by the magnetic head 5a or 5b, from a portion where the rotary drum 2 is in contact with the magnetic tape 3 through an angle of over 180° and represents the actual data to be reproduced. Reference number 24 designates a phase shifter for shifting the phase of a waveform forwardly by a predetermined sampling time to take out forward information.

In operation, like the first embodiment, a reproducing signal of the magnetic head 5 is amplified by the head amplifier 14, and its envelope is detected by the envelope rectifier 15. This analog signal is converted into a digital signal at every sampling time $\Delta T$ by the A/D converter 16 and is transmitted to the waveform storage 23. In the phase shifter 24, an envelope waveform at that time (e.g., (j-1)th execution) stored in the waveform storage 23 is shifted forwardly by a predetermined phase shift time $(K_{tau} \cdot \Delta T)$ corresponding to the sampling time, for example, and is transmitted to the displacement accumulating storage 21. Therefore, in the displacement accumulating storage 21, the displacement represented by the equation (3) rather than the equation (1) is accumulated and stored.

$$ADERR_{j-1}(k \cdot \Delta T) = \sum_{i=1}^{j-1} e_i((k + K_{tau}) \cdot \Delta T) \quad (3)$$

Although in this algorithm, the displacement information as forwardly shifted is eliminated at the terminal end, the displacement should hence be regarded as zero or a constant value.

Subsequently, like the first embodiment, a head-moving signal $X_{cj}(k \cdot \Delta T)$ is produced so as to drive the magnetic head 5 via the D/A converter 19 and the head driver 20. These processes are successively repeated.

According to this embodiment, since the head-moving signal is produced, based on the forward error of the executing pattern accumulated over time, by the waveform storage and the phase shifter, the error converges quickly to obtain a higher quality image.

In the second embodiment, each element the waveform generator 17, the displacement accumulating storage 21, the head-moving signal operating unit 22, the waveform storage 23 and the phase shifter 24 are independent of each other. However, these elements may be substituted by an element such as a microcomputer. The present invention should by no means be limited to the illustrated example.

Since in the head control system according to the second embodiment the previous information for the shifting time will be eliminated at the terminal end, the system assumes that the error is constant. Consequently, it is difficult to achieve a highly improved degree of precision at the terminal end.

FIG. 3 shows a third embodiment of the present invention, in which an error converges quickly, realizing a higher quality image. Like reference numerals designate similar parts throughout FIGS. 2 and 3. In FIG. 3, reference numeral 25 designates a head amplifier for detecting an error in every reproducing signal from the tape portion in contact with the magnetic head. 26 designates an error-detecting envelope rectifier for detecting an envelope of the reproducing signal. The error detecting head amplifier 25 and the error detecting envelope rectifier 26 jointly constitute a detecting unit for processing extraneous signals (signals reproduced outside the 180° angle). 23 designates a second waveform storage for storing an envelope signal inputted via an A/D converter 16a.

The operation of the third embodiment will now be described. This operation is basically similar to that of the second embodiment. In the prior art apparatus, the tape 3 is wound on the drums 1 and 2 through 190°. The actual usable angle for each channel is 180°. Thus the signal only for the angle 180° is cut out, and from the envelope rectifier 15, as shown in FIG. 4(b), an envelope waveform composed of signals channel and channel 2 joined, alternately at every 16.7 ms, is outputted. For this reason, in the second embodiment, the forward information cannot be used at the terminal end. To this end, all information described on the tape, in particular extraneous reproducing signals respectively contiguous to the reproducing signals channel 1 and channel 2 can be utilized by the error detecting head amplifier 25 and the error detecting envelope rectifier 26. These extraneous reproducing signals are then stored in the waveform storage 23. As a result, also when storing the accumulated error of the equation (3), information will also reflect the terminal end.

Thus in the third embodiment, since all information on the wound tape is detected, it is possible to use the actual forward error at the terminal end, thus improving the precision to obtain a higher quality image.

In this embodiment, since the actually usable angle for each channel is enough to reproduce a video image, another error detecting head amplifier and another error detecting envelope rectifier are provided to obtain all information on the wound tape. But a single head amplifier and an envelope rectifier can perform two functions.

FIG. 5 shows a fourth embodiment of the present invention. Like reference numerals designate similar parts throughout FIGS. 1 and 5. In FIG. 5, reference numeral 27 designates an initial-point-control head-moving signal generating unit (hereinafter called "initial point control unit") for outputting a head moving signal of the non-reproduction side of the drum (drum's back side) based on the executing head moving signal outputted from the head-moving signal generating unit 22. This executing head moving signal is outputted to a head driver 20 via a D/A converter 19a. The head driver 20 moves and controls the reproduction-side magnetic head (e.g., 5a) by a reproduction-side head moving signal and moves and controls the non-reproduction-side magnetic head (e.g., 5b) by a non-reproduction-side head moving signal. By this control of the non-reproduction side head, the magnetic head is caused to coincide with the reproduction-side head initial point smoothly. The reproduction-side and non-reproduction-side head controls are performed alternately depending on the angular position of the magnetic head. Preferably, the head movement control on the non-reproduction side should be such that the reproduction-side head terminal point smoothly coincides with the initial point.

The operation of the fourth embodiment will now be described. Basically, this operation is similar to that of the first embodiment. In this embodiment, unlike the first embodiment, the head moving signal obtained from the head-moving signal generating unit 22 is transmitted to the D/A converter 19 and the initial point control unit 27. The initial point control unit 27 obtains the position, speed and acceleration at each initial point and terminal point of the head by using numerical differentiation, for example, based on the reproduction-side head moving signal transmitted from the head-moving signal operating unit 22.

Then, the initial point control unit 27 obtains a waveform of 16.7 ms satisfying the position, speed, and acceleration at each initial point and terminal point as an interpolation waveform such as a six-dimensional equation relating to time. The head driver 20 receives the non-reproduction-side head moving signal with the reproduction-side head moving signal and controls the position of the magnetic head for every complete rotation of the rotary drum.

In the illustrated embodiment, the initial point control unit 27 is provided independently. Alternatively, the control of the initial point may be performed in the head-moving signal generating unit 22.

Further, in the fourth embodiment, a non-reproduction side pattern is determined so as to achieve smooth coincidence for position, speed, and acceleration between the initial point and the terminal point. Alternatively, coincidence may be made only with respect to position and speed. Otherwise, coincidence may be made with respect to parameters having a dimension higher than acceleration.

The fourth embodiment is described here as an expansion of the first embodiment. This fourth embodiment may be adapted also to the second and third embodiments by adding thereto a non-reproduction-side-pattern correcting unit. It may be also applied directly to the prior art apparatus.

FIG. 6 shows a fifth embodiment of the present invention. Like reference numerals designate similar parts throughout FIG. 1 and 6. In FIG. 6, reference numeral 28 designates an envelope pattern database in which various kinds of envelope patterns representing situations other than a track displacement are stored. 29 represents a first reproducing signal detecting unit for detecting a reproducing signal, which is not equal to the patterns in the database 28, by comparing the current envelope pattern transferred from the waveform storage 23 with patterns in the envelope pattern database 28 and by discriminating the lowering of the level of the envelope due to the track displacement and the lowering of level of the envelope due to the other causes. By utilizing this process, the displacement detecting unit 21a can detect an exact track error.

The operation of the fifth embodiment will now be described. Basically, this operation is similar to that of the first embodiment. In this embodiment, unlike the first embodiment, the signal converted by the A/D converter 16 is not directly transferred to the displacement storage 21 but is sent to a waveform storage 23 and a first reproducing signal detecting unit 29.

The waveform storage 23 receives a signal from the A/D converter 16 at every sampling time $\Delta T$ and stores an envelope waveform of the signal. The stored waveform is transferred to the first reproducing signal detecting unit 29. The first reproducing signal detecting unit 29 detects an unpatterned reproducing signal and transfers it to the displacement accumulating storage 21, as shown in the flowchart of FIG. 7. Specifically, at step 30, 'N' indicating whether or not an identical pattern is present is set to 1, and the envelope pattern database 28 is initialized. Then at step 31, an object envelope pattern is inputted from the waveform storage 23. A judgment is made at step 32 on whether N is equal to 1 or not. If it is, at step 33, a model envelope pattern, which is lower in level for causes other than track displacement, is inputted from the envelope pattern data base 28. At step 34, a judgment is made on whether the object envelope pattern and the model envelope pattern are alike or not. If not, retrieving is executed at step 35. If all of the database has not been retrieved, the model envelope pattern is updated with another pattern at step 36 and is inputted again at step 33, and the similar judgment is repeated. If all of the database has been retrieved, since the object envelope pattern is regarded as not being lower in level for causes other than track displacement, a track error of the object envelope waveform is obtained at step 38 and is outputted to the displacement accumulating storage 21 at step 39.

The subsequent procedures are similar to the foregoing ones as indicated in step 40. At step 34, if the object envelope pattern and the model envelope pattern are alike, the pattern is stored as a previous pattern at step 37, and after increasing N by 1, the procedures of steps 38, 39 and 40 are executed. At step 32, if N is not equal to 1, a judgment is made at step 41 on whether the portion of the object envelope pattern, which portion is identical with the portion of the model pattern judged as being a like and lower in level (in the model pattern, the portion lower in level due to causes other than track displacement is known beforehand) due to causes other than track displacement, is changed to a previous pattern. If so changed, since the lower level is due to track displacement, N is returned to 1 at step 42, and the procedures of steps 38, 39, and 40 are executed. At step 41, if the portion lower in level due to causes other than track displacement is not changed, the lower level of this portion is regarded as being due to causes other than track displacement. The error of this portion is determined as a reference value, and a track error of the other portions is obtained in the same manner as at step 38 and is outputted to the displacement accumulating storage 21 at step 39. Subsequently the foregoing processes are repeated.

In the fifth embodiment, since a reference signal is outputted if the lower level is due to causes other than track displacement, it eliminates any possibility that the track displacement could not be corrected by an inexact error signal, thus obtaining a high quality image.

Further, various kinds of envelope patterns when the envelope level is lower due to causes other than track displacement are stored to form a database based on which it is possible to make a distinction between the lower level due to track displacement and that due to causes other than track displacement. The present invention should by no means be limited to this specific example.

Furthermore, although the fifth embodiment is described as an expansion of the first embodiment, this embodiment may be also adapted to the second, third or fourth embodiment. Also it may be applied directly to the prior art apparatus.

According to the present invention, partly since the displacement accumulating storage accumulates and stores the displacement of the magnetic head with respect to the track, and partly since the waveform operating unit produces a head moving waveform based on the previous displacement, the displacement is progressively minimized as the reproduction scanning is repeated, thus obtaining a high quality image.

Further, since the head moving signal at the reproduction side and that at the non-reproduction side smoothly coincide with one another, no vibration or the like will occur at a point of change in movement, guaranteeing a high quality image.

In addition, since a reference signal is outputted only for the level lower due to causes other than track displacement, it is possible that the track displacement could be corrected by an inexact error signal, thereby obtaining a high quality image.

What is claimed is:

1. A magnetic recording and reproducing apparatus having a magnetic head and a rotary drum, comprising:
   magnetic head driver means for moving the magnetic head, which is mounted on an outer periphery of the rotary drum,
   waveform generator means for generating a basic head-moving signal;
   displacement detector means for sampling an amount of displacement of the magnetic head with respect to a target recording track of a magnetic tape for every predetermined period based on a reproducing signal of the magnetic head;
   displacement accumulating means for accumulating the amount of displacement for every new scanning and for storing the amount of displacement per sample;
   head-moving signal generating means for correcting the basic head-moving signal such that a next amount of displacement becomes zero and for generating an executing displacement signal from the corrected basic head-moving signal;
   said magnetic head driver means moving the magnetic head according to said executing displacement signal;
   first waveform means for storing a reproducing signal which is reproduced by the magnetic head corresponding to a portion of the rotary drum which is engageable with the magnetic tape through 180°; and
   phase shifter means for shifting the phase of the stored reproducing signal and for outputting the shifted signal to said displacement detector means;
   said displacement detector means sampling the amount of displacement with respect to the target recording track for every predetermined period based on the phase-shifted reproducing signal.

2. The magnetic recording and reproducing apparatus as claimed in claim 1, wherein said displacement detector means determines the amount of displacement at an end of a sampling, when the reproducing signal is not inputted due to a shifting of its phase, to be a constant value.

3. The magnetic recording and reproducing apparatus as claimed in claim 1, further comprising:
   reproducing signal detector means for detecting an extraneous reproducing signal; and
   second waveform means for storing the extraneous reproducing signal;
   said phase shifter means shifting the phase of the reproducing signal stored in said second waveform means and outputting the shifted signal to said displacement detector means.

4. A magnetic recording and reproducing apparatus having a magnetic head and a rotary drum comprising:
   magnetic head driver means for moving the magnetic head, which is mounted on an outer periphery of the rotary drum, perpendicularly to a scanning direction of the magnetic head;
   waveform generator means for generating a basic head-moving signal;
   displacement detector means for sampling an amount of displacement of the magnetic head with respect to a target recording track of a magnetic tape for every predetermined period based on a reproducing signal of the magnetic head;
   displacement accumulating means for accumulating the amount of displacement for every new scanning and for storing the amount of displacement per sample;
   head-moving signal generating means for correcting the basic head-moving signal such that a next amount of displacement is zero and for generating an executing displacement signal from the corrected basic head-moving signal; and
   said magnetic head driver means moving the magnetic head according to said executing displacement signal;
   initial point control means for smoothly aligning the magnetic head with an initial point based on said executing displacement signal.

5. The magnetic recording and reproducing apparatus as claimed in claim 4, further comprising:

first waveform means for storing a reproducing signal which is reproduced by the magnetic head corresponding to a portion of the rotary drum which is engageable with the magnetic tape through 180°; and phase shifter means for shifting the phase of the stored reproducing signal and for outputting the shifted signal to said displacement detector means;

said displacement detector means sampling the amount of displacement with respect to the target recording track for every predetermined period based on the phase-shifted reproducing signal.

6. The magnetic recording and reproducing apparatus as claimed in claim 5, wherein said displacement detector means determines the amount of displacement at an end of a sampling, when the reproducing signal is not inputted due to a shifting of its phase, to be a constant value.

7. The magnetic recording and reproducing apparatus as claimed in claim 5, further comprising:

reproducing signal detector means for detecting an extraneous reproducing signal; and second waveform means for storing the extraneous reproducing signal;

said phase shifter means shifting the phase of the reproducing signal stored in said second waveform means and outputting the shifted signal to said displacement detector means.

8. A magnetic recording and reproducing apparatus comprising:

magnetic head driver means for moving the magnetic head, which is mounted on an outer periphery of the rotary drum, perpendicularly to a scanning direction of the magnetic head;

a pattern database in which a plurality of model patterns of level changes of a reproducing signal of the magnetic head are stored;

reproducing signal detector means for detecting a reproducing signal, which is not equivalent to any model pattern, by comparing the model patterns and the reproducing signal and for outputting a first signal representing the detection results;

displacement detector means for sampling an amount of displacement of the magnetic head with respect to a target recording track of a magnetic tape for every predetermined period based on the first signal;

displacement accumulating means for accumulating the amount of displacement for every new scanning and for storing the amount of displacement per sample;

waveform generator means for generating a head-moving basic signal;

displacement signal generating means for correcting the basic head-moving signal such that a next amount of displacement is zero and for generating an executing displacement signal; and first waveform means for storing a reproducing signal which is reproduced by the magnetic head corresponding to a portion of the rotary drum which is engageable with the magnetic tape through 180°;

said magnetic head driver means moving the magnetic head according to said executing displacement signal.

9. The magnetic recording and reproducing apparatus as claimed in claim 8, further comprising:

phase shifter means for shifting the phase of the stored reproducing signal and for outputting the shifted signal to said displacement detector means;

said displacement detector means sampling the amount of displacement with respect to the target recording track for every predetermined period based on the phase-shifted reproducing signal.

10. The magnetic recording and reproducing apparatus as claimed in claim 9, wherein said displacement detector means determines the amount of displacement at an end of a sampling, when the reproducing signal is not inputted due to a shifting of its phase, to be a constant value.

11. The magnetic recording and reproducing apparatus as claimed in claim 9, further comprising:

reproducing signal detector means for detecting an extraneous reproducing signal;

second waveform means for storing the extraneous reproducing signal; and said phase shifter means shifting the phase of the reproducing signal stored in said second waveform means and outputting the shifted signal to said displacement detector means.

12. The magnetic recording and reproducing apparatus as claimed in claim 8, further comprising:

initial point control means for smoothly aligning the magnetic head with an initial point based on the executing displacement signal.

13. The magnetic recording and reproducing apparatus as claimed in claim 12, further comprising:

phase shifter means for shifting the phase of the stored reproducing signal and for outputting the shifted signal to said displacement detector means;

said displacement detector means sampling the amount of displacement with respect to the target recording track for every predetermined period based on the phase-shifted reproducing signal.

14. The magnetic recording and reproducing apparatus as claimed in claim 13, wherein said displacement detector means determines the amount of displacement at an end of a sampling, when the reproducing signal is not inputted due to a shifting of its phase, to be a constant value.

15. The magnetic recording and reproducing apparatus as claimed in claim 13, further comprising:

reproducing signal detector means for detecting an extraneous reproducing signal;

second waveform means for storing the extraneous reproducing signal; and said phase shifter means shifting the phase of the reproducing signal stored in said second waveform means and outputting the shifted signal to said displacement detector means.

* * * * *

UNITED STATES PATENT AND TRADEMARK OFFICE
CERTIFICATE OF CORRECTION

PATENT NO. : 5,247,404  
DATED : Sep. 21, 1993  
INVENTOR(S) : Takeda

Page 1 of 3

It is certified that error appears in the above-indentified patent and that said Letters Patent is hereby corrected as shown below:

Col. 1, line 22, change "reference numeral" to --reference numeral 1--;

Line 23, change "drum I" to --drum 1--;

Line 37, change "I8" to --18--.

Col. 3, line 65, change "FIG." to --FIG. 2 is--.

Col. 4, line 1, change "FIGS. 4(a) and 4b) are diagram showing typical" to --FIGS. 4a and 4b are diagrams showing a time chart and a typical--;

Line 2, change "waveforms" to --waveform--;

Line 4, change "a embodiment" to --a fourth embodiment--;

Line 14, change "13 respectively" to --13 are figures respectively--;

Line 24, change "FIGS. I" to --FIGS. 1--;

Line 35, change "generating unit" to --operating unit--;

Line 38, change "accumulated amount" to --amount--;

Line 55, in formula (1), change "i-1" to --i=1--;

UNITED STATES PATENT AND TRADEMARK OFFICE
CERTIFICATE OF CORRECTION

PATENT NO. : 5,247,404
DATED : Sep. 21, 1993
INVENTOR(S) : Takeda

It is certified that error appears in the above-identified patent and that said Letters Patent is hereby corrected as shown below:

Col. 4, line 58, change "generating unit" to --operating unit--;

Line 61, change "ADERRj(1•$\Delta$T)" to --ADERRj(k•$\Delta$T)--;

Line 63, change "generating unit" to --operating unit--;

Line 65, change "9" to --19--.

Col. 5, line 3, change "generating unit" to --operating unit--;

Line 17, change "exeouting" to --executing--;

Line 40, change "FIGS. I" to --FIGS. 1--.

Col. 6, Line 40, change "from the" to --for the-- and delete the new paragraph thereafter;

Line 49, change "16a" to --16--;

Lines 57-58, change "channel and channel 2" to --channel 1 and channel 2--;

Line 63, change "channel I" to --channel 1--.

Col. 7, Lines 22, 43 and 63, change "generating unit" to --operating unit--.

UNITED STATES PATENT AND TRADEMARK OFFICE
CERTIFICATE OF CORRECTION

PATENT NO. : 5,247,404
DATED : Sep. 21, 1993
INVENTOR(S) : Takeda

It is certified that error appears in the above-identified patent and that said Letters Patent is hereby corrected as shown below:

<u>Col. 8</u>, lines 15-16, change "a first reproducing signal detecting unit" to --an unsuitable reproduction signal detector--;

Line 32, change "a first reproducing signal detecting unit" to --the unsuitable reproduction signal detector--;

Lines 36-37, change "first reproducing signal detecting unit" to --unsuitable reproduction signal detector--;

Lines 37-38, change "first reproducing signal detecting unit" to --unsuitable reproduction signal detector--.

<u>Col. 9</u>, line 52, change "inexact" to --exact--.

IN THE CLAIMS:

<u>Col. 10</u>, lines 3 and 56, change "generating means" to --operating means--.

<u>Col. 11</u>, line 56, change "generating means" to --operating means--.

Signed and Sealed this

Eighteenth Day of October, 1994

Attest:

BRUCE LEHMAN

Attesting Officer    Commissioner of Patents and Trademarks